(12) United States Patent
Dubinsky

(10) Patent No.: US 11,621,852 B1
(45) Date of Patent: Apr. 4, 2023

(54) SYSTEM AND METHOD FOR PROVIDING A MULTIPLE-OPERATION TRANSACTION TO A BLOCKCHAIN

(71) Applicant: Source Ltd., Valletta (MT)

(72) Inventor: Ilya Dubinsky, Kefar Sava (IL)

(73) Assignee: Source Ltd., Valletta (MT)

(*) Notice: Subject to any disclaimer, the term of this patent is extended or adjusted under 35 U.S.C. 154(b) by 0 days.

(21) Appl. No.: 17/540,482

(22) Filed: Dec. 2, 2021

(51) Int. Cl.
*H04L 9/32* (2006.01)
*H04L 9/00* (2022.01)

(52) U.S. Cl.
CPC .............. *H04L 9/3239* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 10,826,685 B1* | 11/2020 | Campagna | H04L 9/3247 |
| 2019/0363874 A1* | 11/2019 | Shirley | H04L 9/3239 |
| 2020/0042965 A1* | 2/2020 | Ganesan | G06Q 20/3825 |
| 2020/0104809 A1* | 4/2020 | Destefanis | G06Q 20/3825 |
| 2021/0233071 A1* | 7/2021 | Wright | H04L 9/0894 |
| 2021/0273993 A1* | 9/2021 | Shirley | H04L 67/108 |
| 2021/0279722 A1* | 9/2021 | Magerkurth | H04L 63/0442 |
| 2021/0312438 A1* | 10/2021 | Li | G06F 16/275 |

OTHER PUBLICATIONS

Garba, A., 2021. LightLedger: A novel blockchain-based domain certificate authentication and validation scheme. IEEE Transactions on Network Science and Engineering, 8(2), pp. 1698-1710. (Year: 2021).*

Yang, Y.T, 2019. Blockchain-based traffic event validation and trust verification for VANETs. IEEE Access, 7, pp. 30868-30877. (Year: 2019).*

* cited by examiner

*Primary Examiner* — Luu T Pham
*Assistant Examiner* — Edward X Long
(74) *Attorney, Agent, or Firm* — Pearl Cohen Zedek Latzer Baratz LLP

(57) ABSTRACT

Systems and methods of providing a multiple-operation transaction to a blockchain receive a plurality of related operations which collectively constitute a transaction between respective computing devices of a plurality of parties to the transaction, each of the plurality of related operations comprising a data set comprising: a value, a target, and a unique number; calculate a hash value using at least the plurality of related operations; and publish the hash value to a pool of unclaimed hash values; wherein, once a given operation of the plurality of operations is performed, the operation is published to a pool of unprocessed operations; and wherein at least one mining node is configured to sign the transaction into a block of the blockchain only if the at least one mining node has chosen, from the pool of unprocessed operations, a subset of operations whose hash value is identical to the unclaimed hash value.

16 Claims, 2 Drawing Sheets

SYSTEM AND METHOD FOR PROVIDING A MULTIPLE-OPERATION TRANSACTION TO A BLOCKCHAIN

FIELD OF THE INVENTION

The present invention relates to blockchain transactions. More particularly, the present invention relates to systems and methods for providing a multiple-operation transaction to a blockchain.

BACKGROUND OF THE INVENTION

Distributed ledger systems (DLSs), which may be referred to as consensus networks, and/or blockchain networks, enable participating entities to securely, and immutably store data relating to transactions in distributed ledgers. DLSs are commonly referred to as blockchain networks or blockchains.

As transactions are recorded, each transaction is locked irrevocably into a chain of transactions (also referred to as the audit trail, or blockchain) using cryptographic hash functions (known as "hashing") that create digests containing the current transaction and the historical ones that led to the very last (and most current) transaction. Briefly, a hash function takes an input message in digital form, scrambles the message, and condenses it to a shorter digest such that even a minor change in the original message will result in a vastly different digest that is output, compared with the output of the unchanged original message. Hashing functions are easy to compute in one direction and difficult to find the inverse. There are a number of standard hash functions commonly used, such as, for example, MD5, MD4, SHA-256, and SHA-1. Accordingly, histories of previous transactions are further locked irrevocably in blocks of the blockchain by hashing those histories along with the most recent transaction, providing a comprehensive chain of transactions from genesis to the most recent transaction that can be used to audit the transactions.

Current systems and methods for providing and/or recording transactions to a blockchain are limited to individual transactions but cannot ensure multiple related transactions are completed together.

SUMMARY OF THE INVENTION

Embodiments of the present invention include systems and methods for providing a multiple-operation transaction to a blockchain. A method of providing a multiple-operation transaction to a blockchain receives a plurality of related operations which collectively constitute a transaction between respective computing devices of a plurality of parties to the transaction, each of the plurality of related operations comprising a data set comprising: a value, a target, and a unique number; calculates a hash value using at least the plurality of related operations; and publishes the hash value to a pool of unclaimed hash values; in which, once a given operation of the plurality of operations is performed, the operation is published to a pool of unprocessed operations; and in which at least one mining node is configured to sign the transaction into a block of the blockchain only if the at least one mining node has chosen, from the pool of unprocessed operations, a subset of operations whose hash value is identical to the unclaimed hash value.

In some embodiments, a given value represents a value to be transferred in the transaction; a given target is a party of the plurality of parties to the transaction; and a different unique number is generated for each operation of the transaction.

In some embodiments, the unique number is a randomly generated number.

In some embodiments, operations that are part of the transaction are ordered lexicographically prior to calculating the hash value.

Some embodiments further include adding at least one bogus operation to the related operations prior to calculation of the hash value.

In some embodiments, the at least one bogus operation is of insignificant or valueless value.

In some embodiments, the bogus operation comprises a dummy target.

Some embodiments further include publishing at least one bogus operation to the pool of unprocessed operations.

Some embodiments further include appending an un-hashed meta-transaction to the block, wherein the at least one mining node is an additional target of the un-hashed meta-transaction.

Some embodiments further include providing multiple pools of unprocessed operations and multiple pools of unclaimed hashes, in which multiple hash values are published to the multiple pools of unclaimed hash values; in which multiple operations are published to the multiple pools of unprocessed operations; and in which at least one mining node is configured to sign the transaction into a block of the blockchain only if the at least one mining node has chosen, from the multiple pools of unprocessed operations, a subset of operations whose hash value is identical to a given unclaimed hash value from a pool of the multiple pools of unclaimed hashes.

In accordance with further embodiments of the invention, systems may be provided which may implement the methods described herein according to some embodiments of the invention.

These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
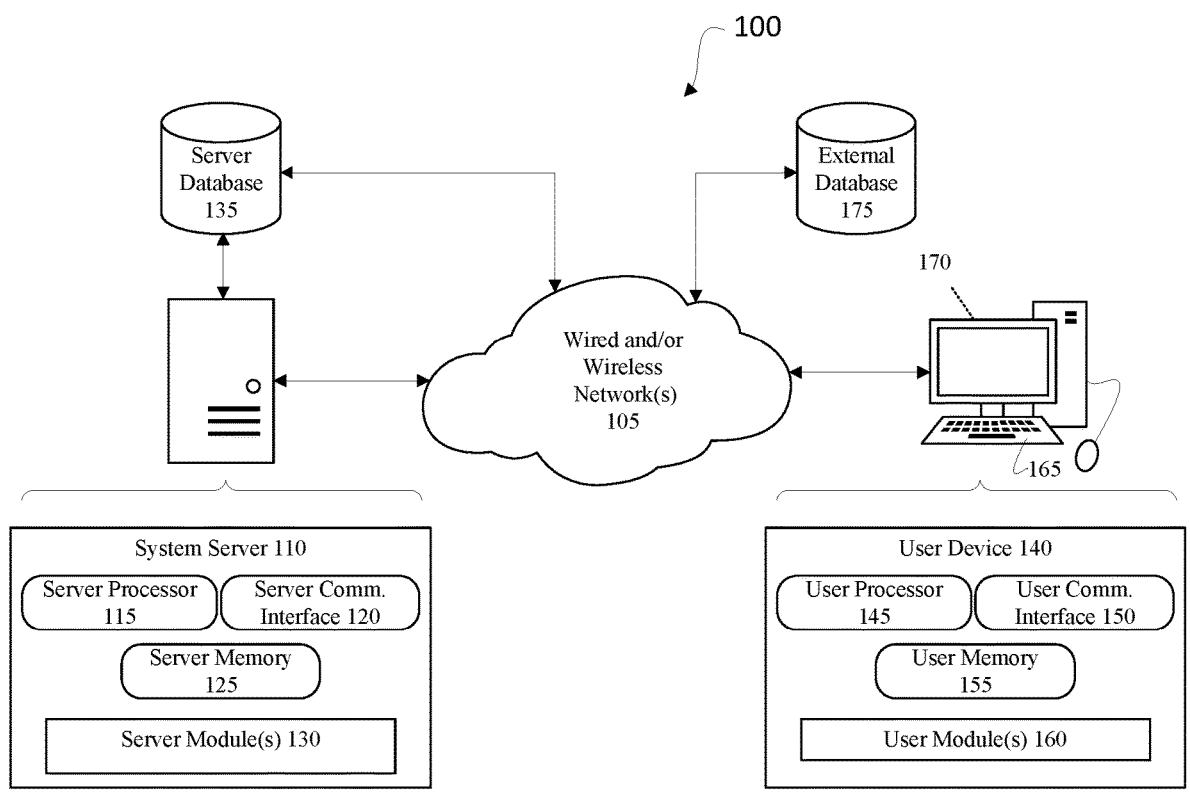
FIG. 1 shows a high-level diagram illustrating an example configuration of a system for providing a multiple-operation transaction to a blockchain, according to at least one embodiment of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION

In the detailed description herein, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Embodiments of the invention address the challenge of ensuring atomic multi-operation transactions. For example, assume scenario in which: (1) A will transfer something to B; (2) B will transfer something to C; (3) C will transfer something to A; and (4) C will transfer another something to A. A key goal is to be able to create an atomic situation in which if one transaction is completed, all are completed. Embodiments of the invention may enable at least the following:

Creating the multiple transactions (in this example, four) in an immutable way;

Ensuring each transaction can be signed (executed) by A, B and C respectively;

Enabling transactions to be considered complete only if all transactions are in the same block when signed; and Ensuring that a mining node that creates the block comprising the transactions recognizes that if one transaction is included in the block, all the transactions must be in the same block.

In presently available prior art systems, the blockchain protects itself from attacks by ensuring that calculating the hash to a block is computationally difficult. For instance, Bitcoin achieves this by asking mining nodes to append a unique integer to the block so that the hash of the total block will start with a predefined number of zeroes, and mining nodes have to try numbers one by one until the resulting hash meets the requirement.

In various embodiments of the invention, by contrast, the computational complexity is achieved by forcing miner nodes to select a subset from a set of pending transactions, as explained herein. As the number of subsets of a set grows exponentially with the size of the set, this ensures that closing off a new block is computationally difficult enough to protect the chain, e.g., from the Byzantine Generals attack (i.e., preventing unreliable actors from not executing their part of a multi-operation transaction). These and other aspects of the invention will be explained with reference to the figures.

FIG. 1 shows a high1level diagram illustrating an example configuration of a system 100 for providing a multiple-operation transaction to a blockchain, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein and may be written in any combination of one or more programming languages. Server processor 115 may be configured to carry out embodiments of the present invention by, for example, executing code or software, and may execute the functionality of the modules as described herein.

As shown in FIG. 1, the exemplary software modules may include a communication module, and other modules as described here. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are therefore intended to be representative of the various functionalities of system server 110 in accordance with some embodiments of the invention. It should be noted that in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
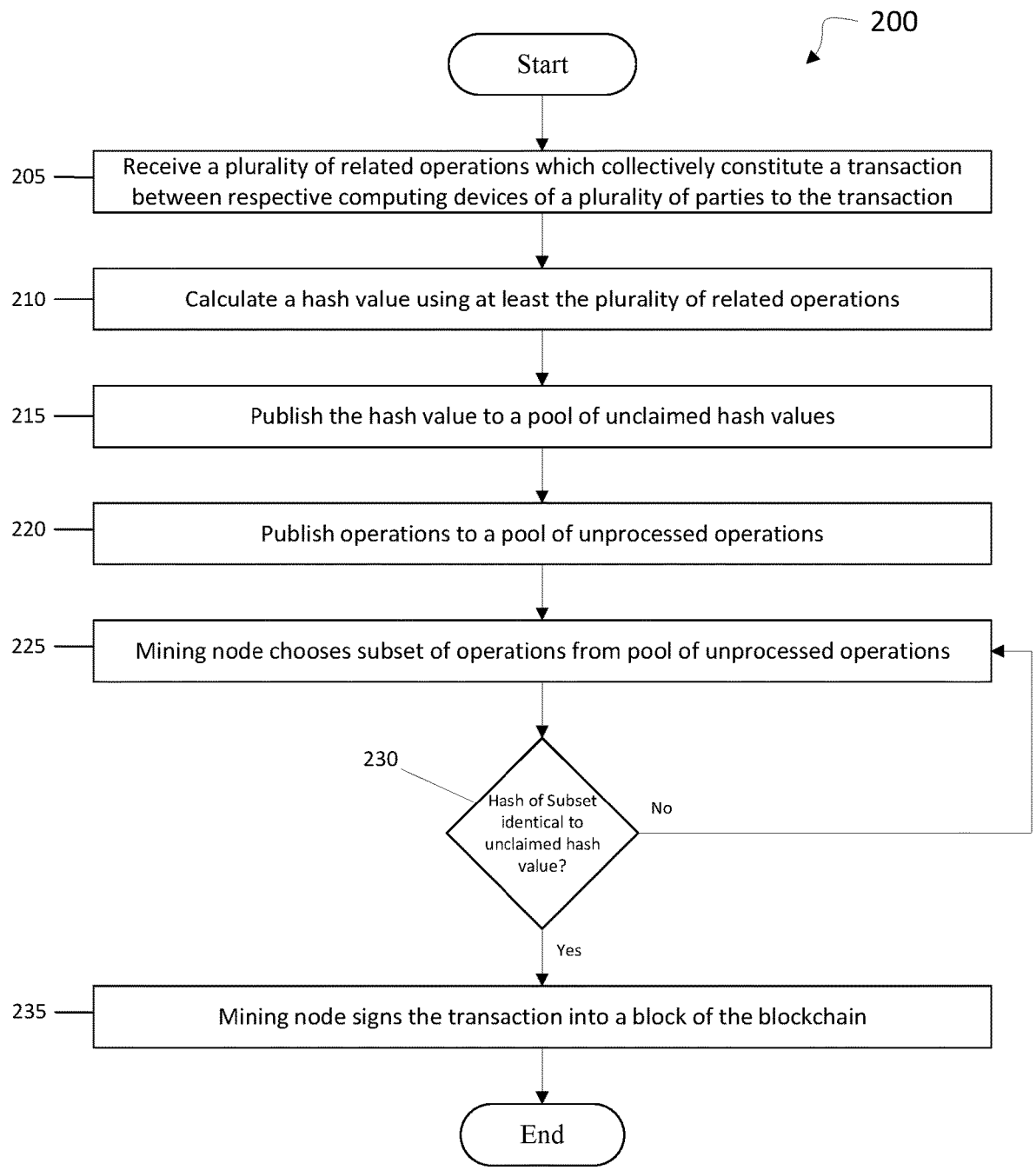
FIG. 2 is a flow diagram of a method 200 for providing a multiple-operation transaction to a blockchain, according to at least one embodiment of the invention.

FIG. 2 is a flow diagram of a method 200 for providing a multiple-operation transaction to a blockchain, according to at least one embodiment of the invention. It should be noted that, in some embodiments, method 200 may be configured to implement one or more of the elements, features, and/or functions of system 100, e.g., as described in detail herein.

In some embodiments, method 200 may be performed on a computer having a processor, a memory, and one or more code sets stored in the memory and executed by the processor. In some embodiments, method 200 begins at step 205 when the processor may be configured to receive a plurality of related operations which collectively constitute a transaction between respective computing devices of a plurality of parties to the transaction. In some embodiments, each of the plurality of related operations includes a data set comprising: a value, a target, and a unique number, as described herein.

In some embodiments, a given value may represent a value to be transferred in the transaction. In some embodiments, a given target may be a party of the plurality of parties to the transaction. In some embodiments, a different unique number may be generated for each operation of the transaction. In some embodiments, the target of each operation is denoted T, and the value is denoted as V. The parties add to each operation a unique random number, N.

For example, multiple parties may be involved in a multi-lateral real-world transaction in which they agree on operations that collectively constitute a multiple-operation transaction. In some embodiments, each operation may have at least a "value" and a "target." For instance, $10,000 is to be paid to party A, and ownership of a car with license plate number L is to be transferred to party B. Therefore, for the first operation, the target (T1) is A and the value is $10,000 (V1), and for the second operation, the target (T2) is B and the value (V2) is L (representing the car). In some a unique number (N) may be randomly generated for each transaction.

Next, at step 210, in some embodiments, the processor may calculate a hash value using at least the plurality of related operations. For example, in some embodiments, the parties to the multiple-operation transaction may calculate a hash value, which includes triplets (T, V, N) of operations that are part of the transaction. In some embodiments, the operations that are part of the transaction may be ordered lexicographically prior to calculating the hash value.

In some embodiments, the parties may add one or more additional "bogus" operations (e.g., of an insignificant or valueless value, and involving, dummy targets) to the list of triplets prior to calculation of the hash, thus increasing computational difficulty.

Next, at step 215, in some embodiments, the processor may be configured to publish the hash value as "unclaimed hash value" to a pool of unclaimed hash values. In some embodiments, miners (i.e., mining nodes) may access the pool of unclaimed hash values and attempt to match unclaimed hash values with sets of operations, as explained herein.

Next, at step 220, in some embodiments, e.g., after publishing the hash value to the pool of unclaimed hash values, in some embodiments, as the parties to the multiple-operation transaction perform their various necessary individual operations, the operations may be posted into a pool of "unprocessed operations." For example, once, or after, or triggered by, a given operation of the plurality of operations being performed, the operation is published to a pool of unprocessed operations. In some embodiments, more bogus operations may be posted to the pool as needed, e.g., commensurate with the number of real operations, randomly, etc. In some embodiments, real and fake triplets may be pushed to the pool of unprocessed operations. e.g. with a goal of keeping the complexity of subset selection high.

Next, at step 225, mining nodes may choose subsets of operations from the pool of unprocessed operations and attempt to match the hash values of the chosen subsets with an unclaimed hash value from the pool of unclaimed hash values.

Accordingly, at step 230, if a mining node has chosen, from the pool of unprocessed operations, a subset of operations whose hash value is not identical to the unclaimed hash value, then the mining node may discard the subset and choose a new subset to compare with the unclaimed hash value. It should be noted, that, in alternative embodiments, the mining node may instead discard the unclaimed hash value in favor of another unclaimed hash value from the pool of unclaimed hash values. Regardless, mining nodes attempting to find a subset of operations whose hash value is identical to an unclaimed hash value may inadvertently include one or more bogus operations, may inadvertently order the operations incorrectly, etc.

However, if, as step 225, a mining node has chosen a subset of operations from the pool of unprocessed operations whose hash value is identical to the unclaimed hash value (step 230), then, at step 235, in some embodiments, the mining node may be configured to sign the transaction into a block of the blockchain. In some embodiments, mining nodes may only sign a block of the chain if (or in some embodiments only if) it contains at least one successful claim on an unclaimed hash. E.g., a mining node in some examples may sign a block only if the mining node has chosen, from the pool of unprocessed operations, a subset of operations whose hash value is identical to the unclaimed hash value. A successful claim on an unclaimed hash means that the mining node has chosen, out of all transactions associated with an unclaimed hash (e.g., real or bogus), a subset of triplets whose hash value is identical to the unclaimed one.

Customarily, miners (e.g., mining nodes) are rewarded with a digital currency for successfully completing a block of the blockchain. Accordingly, in some embodiments, a mining node that is able to successfully sign a set of operations (i.e., a multi-operation transaction) into a block may be allowed to add a single additional or ancillary individual operation (e.g., not belonging to any set or conforming to a hash) to the block of which the mining node itself is a target. For example, in some embodiments, the processor may be configured to append an un-hashed meta-transaction to the block, in which the mining node that completed the block is the target of the un-hashed meta-transaction.

In some embodiments, the scale of the systems and methods provided herein may be increased, e.g., to provide additional computational complexity. For example, in some embodiments, multiple pools of unprocessed operations and/or multiple pools of unclaimed hashes may be provided. In some embodiments, multiple unclaimed hash values may be published to the multiple pools of unclaimed hash values and/or multiple operations (real and bogus) may be published to the multiple pools of unprocessed operations. In some embodiments, mining nodes may be required to identify, from the multiple pools of unprocessed operations, a subset of operations whose hash value is identical to a given unclaimed hash value, e.g., from one of the pools of the multiple pools of unclaimed hashes. Accordingly, a mining node may be configured to sign the transaction into a block of the blockchain only if the mining node has chosen, from the multiple pools of unprocessed operations, a subset of operations whose hash value is identical to a given unclaimed hash value from a pool of the multiple pools of unclaimed hashes.

Embodiments of the invention provide a practical, real-world improvement to prior art blockchain systems by providing for multiple-operation transactions to be captured while ensuring that all required operations are completed for the block to be signed, thus drastically improving efficiency, reducing unnecessary processing of uncompleted multiple-operation (and multiple party) transactions.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of providing a multiple-operation transaction to a blockchain, comprising:
   receiving, by a processor, a plurality of related operations which collectively constitute a transaction between respective computing devices of a plurality of parties to the transaction, each of the plurality of related operations comprising a data set comprising: a value, a target, and a unique number;
   adding at least one bogus operation to the related operations;
   calculating, by the processor, a hash value using at least the plurality of related operations;
   publishing, by the processor, the hash value to a pool of unclaimed hash values; and
   posting at least one bogus operation to a pool of unprocessed operations, the posting of at least one bogus operation commensurate with a number of real operations;
      wherein, once a given operation of the plurality of operations is performed, the operation is published to the pool of unprocessed operations; and
      wherein at least one mining node is configured to sign the transaction into a block of the blockchain only if the at least one mining node has chosen, from the pool of unprocessed operations, a subset of operations whose hash value is identical to the unclaimed hash value.

2. The method as in claim 1, wherein:
   a given value represents a value to be transferred in the transaction;
   a given target is a party of the plurality of parties to the transaction; and
   a different unique number is generated for each operation of the transaction.

3. The method as in claim 2, wherein the unique number is a randomly generated number.

4. The method as in claim 1, wherein operations that are part of the transaction are ordered lexicographically prior to calculating the hash value.

5. The method as in claim 1, wherein the at least one bogus operation is of insignificant or valueless value.

6. The method as in claim 1, wherein the bogus operation comprises a dummy target.

7. The method as in claim 1, further comprising appending an un-hashed meta-transaction to the block, wherein the at least one mining node is an additional target of the un-hashed meta-transaction.

8. The method as in claim 1, further comprising providing multiple pools of unprocessed operations and multiple pools of unclaimed hashes,
   wherein, multiple hash values are published to the multiple pools of unclaimed hash values;
   wherein, multiple operations are published to the multiple pools of unprocessed operations; and
   wherein at least one mining node is configured to sign the transaction into a block of the blockchain only if the at least one mining node has chosen, from the multiple pools of unprocessed operations, a subset of operations whose hash value is identical to a given unclaimed hash value from a pool of the multiple pools of unclaimed hashes.

9. A system of providing a multiple-operation transaction to a blockchain, comprising:
   a processor; and
   a memory; and
   one or more code sets stored in the memory, which, when executed by the processor, configure the processor to:
      receive a plurality of related operations which collectively constitute a transaction between respective computing devices of a plurality of parties to the transaction, each of the plurality of related operations comprising a data set comprising: a value, a target, and a unique number;
      add at least one bogus operation to the related operations;
      calculate a hash value using at least the plurality of related operations; and
      publish the hash value to a pool of unclaimed hash values; and
      post at least one bogus operation to a pool of unprocessed operations, the posting of at least one bogus operation commensurate with a number of real operations;
         wherein, once a given operation of the plurality of operations is performed, the operation is published to a pool of unprocessed operations; and
         wherein at least one mining node is configured to sign the transaction into a block of the blockchain only if the at least one mining node has chosen, from the pool of unprocessed operations, a subset of operations whose hash value is identical to the unclaimed hash value.

10. The system as in claim 9, wherein:
   a given value represents a value to be transferred in the transaction;
   a given target is a party of the plurality of parties to the transaction; and
   a different unique number is generated for each operation of the transaction.

11. The system as in claim 10, wherein the unique number is a randomly generated number.

12. The system as in claim 9, wherein operations that are part of the transaction are ordered lexicographically prior to calculating the hash value.

13. The system as in claim 9, wherein the at least one bogus operation is of insignificant or valueless value.

14. The system as in claim 9, wherein the bogus operation comprises a dummy target.

15. The system as in claim 9, wherein the processor is further configured to append an un-hashed meta-transaction to the block, wherein the at least one mining node is an additional target of the un-hashed meta-transaction.

16. The system as in claim 9, wherein the processor is further configured to provide multiple pools of unprocessed operations and multiple pools of unclaimed hashes,
   wherein, multiple hash values are published to the multiple pools of unclaimed hash values;
   wherein, multiple operations are published to the multiple pools of unprocessed operations; and
   wherein at least one mining node is configured to sign the transaction into a block of the blockchain only if the at least one mining node has chosen, from the multiple pools of unprocessed operations, a subset of operations whose hash value is identical to a given unclaimed hash value from a pool of the multiple pools of unclaimed hashes.

\* \* \* \* \*